(12) United States Patent
Morales et al.

(10) Patent No.: US 7,843,878 B2
(45) Date of Patent: Nov. 30, 2010

(54) METHOD AND APPARATUS TO CONTROL HANDOFF BETWEEN DIFFERENT WIRELESS SYSTEMS

(75) Inventors: Linda Morales, Dallas, TX (US); Geng Wu, Plano, TX (US); Azeem Ahmad, Plano, TX (US); David W. Paranchych, Richardson, TX (US); Mini Vasudevan, Richardson, TX (US); Yusuke Higashi, Dallas, TX (US)

(73) Assignee: Ericsson AB, Stockholm (SE)

( * ) Notice: Subject to any disclaimer, the term of this patent is extended or adjusted under 35 U.S.C. 154(b) by 2784 days.

(21) Appl. No.: 09/960,008

(22) Filed: Sep. 21, 2001

(65) Prior Publication Data

US 2002/0067707 A1    Jun. 6, 2002

Related U.S. Application Data (60) Provisional application No. 60/251,492, filed on Dec. 4, 2000.

(51) Int. Cl.
G08C 17/00 (2006.01)
H04J 3/16 (2006.01)
H04W 36/00 (2009.01)

(52) U.S. Cl. .................. 370/331; 370/466; 455/436

(58) Field of Classification Search .......... None
See application file for complete search history.

(56) References Cited

U.S. PATENT DOCUMENTS

| | | | |
|---|---|---|---|
| 5,649,000 A | | 7/1997 | Lee et al. |
| 5,697,055 A | * | 12/1997 | Gilhousen et al. ........... 455/436 |
| 5,732,076 A | * | 3/1998 | Ketseoglou et al. ......... 370/347 |
| 5,978,769 A | * | 11/1999 | Brown et al. .................... 705/4 |
| 6,321,090 B1 | * | 11/2001 | Soliman .................... 455/440 |
| 6,501,952 B1 | * | 12/2002 | Foster et al. ................. 455/436 |
| 6,519,457 B1 | * | 2/2003 | Jiang et al. .................. 455/442 |
| 6,532,226 B1 | * | 3/2003 | Lehtinen et al. ............. 370/347 |
| 6,584,087 B1 | * | 6/2003 | Czaja et al. ................. 370/335 |
| 6,628,632 B1 | * | 9/2003 | Dolan ........................ 370/332 |

(Continued)

FOREIGN PATENT DOCUMENTS

EP    0 777 396 A1    6/1997

OTHER PUBLICATIONS

"IS-95 CDMA and cdma2000", by Vijay K. Garg, © 2000 Prentice Hall, p. 194.*

(Continued)

*Primary Examiner*—Warner Wong
(74) *Attorney, Agent, or Firm*—Trop Pruner & Hu, P.C.

(57) ABSTRACT

A wireless communications network includes a first base station system that performs wireless communications according to a first protocol (e.g., 1xEV-DO protocol) and a second base station system that performs wireless communications according to a second, different protocol (e.g., IS-2000). A link is provided between the first and second base station systems to enable a network-initiated handoff procedure. If a source base station system detects that a handoff of a mobile station to a target base station system is required, the source base station system exchanges messaging over the link with the target base station system to perform the handoff. In one example, the handoff is a hard handoff.

31 Claims, 3 Drawing Sheets

U.S. PATENT DOCUMENTS

| | | | | |
|---|---|---|---|---|
| 6,665,284 B1* | 12/2003 | Tran et al. | .................... | 370/334 |
| 6,879,830 B1* | 4/2005 | Vollmer et al. | .............. | 455/442 |
| 6,894,994 B1* | 5/2005 | Grob et al. | .................. | 370/335 |
| 7,016,326 B2* | 3/2006 | Holcman et al. | ............ | 370/331 |
| 7,089,008 B1* | 8/2006 | Back et al. | .................. | 455/437 |
| 7,151,756 B1* | 12/2006 | Park et al. | .................... | 370/331 |
| 7,254,392 B2* | 8/2007 | Kauhanen | ................... | 455/436 |
| 2003/0002525 A1* | 1/2003 | Grilli et al. | ................. | 370/465 |
| 2003/0013450 A1* | 1/2003 | Wang et al. | ................. | 455/442 |
| 2006/0019664 A1* | 1/2006 | Nelakanti et al. | ........... | 455/436 |
| 2006/0148511 A1* | 7/2006 | Bender et al. | ............ | 455/550.1 |

OTHER PUBLICATIONS

C. Perkins, , Request for Comments 2002, "IP Mobility Support," Oct. 1996, pp. 1-74.

"1xEV-DO Inter-Operability Specification (IOS) for CDMA 2000 Access Network Interfaces," 3rd Generation Partnership Project 2 "3GPP2", Release 0, 3GPP2 A.S0007, Ballot Version, Jun. 14, 2001, pp. 1-1 to 5-2, A-1 to E-2.

"3GPP2 Access Network Interfaces Interoperability Specification," 3rd Generation Partnership Project 2 "3GPP2", 3GPP2 A.S0001-A, Nov. 30, 2000, pp. 1-518.

Bender et al., *CDMA/HDR: A Bandwidth-Efficient High-Speed Wireless Data Service For Nomadic Users*, IEEE Communications Magazine, IEEE Service Center, Piscataway, NJ, vol. 38, No. 7, Jul. 2000, pp. 70-77.

* cited by examiner

METHOD AND APPARATUS TO CONTROL HANDOFF BETWEEN DIFFERENT WIRELESS SYSTEMS

CROSS-REFERENCE TO RELATED APPLICATION

This claims the benefit under 35 U.S.C. §119(e) of U.S. Provisional Application Ser. No. 60/251,492, filed Dec. 4, 2000.

TECHNICAL FIELD

The invention relates generally to methods and apparatus for controlling handoffs between different wireless systems.

BACKGROUND

Mobile communications systems, such as cellular or personal communications services (PCS) systems, are made up of a plurality of cells. Each cell provides a radio communication center in which a mobile station establishes a call with another mobile station or a wireline unit connected to a public switched telephone network (PSTN) or a packet switched data network (PSDN). Each cell includes a radio base station, with each base station connected to a mobile switching center that controls processing of calls between or among mobile stations or mobile stations and wireline terminals.

Various wireless protocols exist for defining communications in a wireless network. One such protocol is the time-division multiple access (TDMA) standard, such as the TIA/EIA-136 standard provided by the Telecommunications Industry Association (TIA). Another TDMA-based wireless communications technology is the Global System for Mobile (GSM) technology. According to TDMA, each radio frequency (RF) carrier carries a frame that is divided into plural (e.g., six or eight) times slots to increase the number of mobile stations that can be supported per RF carrier.

Another standard for wireless communications is the code-division multiple access (CDMA) standard, with versions implemented as the IS-95A and IS-95B standards. CDMA is a spread spectrum wireless communications protocol in which transmission is based on the spread spectrum modulation technique to allow many users to have access to the same band of carriers.

Traditionally, wireless networks have been designed for carrying circuit-switched voice traffic. However, with the explosion of the Internet and intranets, packet-switched communications (e.g., web browsing, electronic mail, and so forth) have become common. As a result, third generation (3G) wireless technologies are being developed to transition to higher bandwidth and more efficient packet-switched communications (of data as well as voice and other forms of real-time data) over wireless networks.

To achieve 3G requirements, the CDMA 2000 family of standards has been developed, also referred to as the IS-2000 standards. A CDMA 2000 wireless communications system is capable of supporting both traditional voice traffic as well as packet-switched traffic, such as web browsing, electronic mail, voice-over-IP (Internet Protocol), and so forth. On the TDMA side, packet-switched wireless communications protocols have also been developed, including the Enhanced Data Rate for Global Evolution (EDGE) technology, sometimes referred to as Enhanced GPRS (General Packet Radio Service).

The first phase of CDMA 2000 is referred to as 1xRTT (also referred to as 3G1X or 1X), which is designed to increase voice capacity as well as to support data transmission speeds that are faster than typically available. In addition, for even higher data rates, a High Data Rate (HDR) wireless technology has been developed. HDR is defined as TIA/EIA/IS-856, "CDMA 2000, High Rate Packet Data Air Interface Specification," which is adopted by the TIA. The HDR technology is also referred to as the 1xEV-DO or 1xEV technology. 1xEV-DO provides relatively high data transfer rates over the air interface between mobile stations and base stations (referred to as access networks or ANs by 1xEV-DO).

For mobile stations that are capable of working in both 1xRTT and 1xEV-DO systems, a graceful way has not been developed for transitioning a mobile station between a 1xEV-DO system and a 1xRTT system. One current scheme that exists for transitioning a mobile station between 1xEV-DO and 1xRTT systems is that when a mobile station transitions from one system to another, the call is actually dropped (or terminated) in the system that the mobile station is leaving and re-originated in the system that the mobile station is entering.

A need exists for an improved method and apparatus of transitioning mobile stations between different wireless systems, such as 1xRTT and 1xEV-DO systems.

SUMMARY

In general, according to one embodiment, a method of performing wireless communications comprises communicating bearer traffic for a packet-switched communications session between a mobile station and a first base station associated with a first type of wireless system, and determining if handoff is required from the first base station to a second base station associated with a second, different type of wireless system. Messages are exchanged between the first and second base stations to perform the handoff in response to determining that the handoff is required.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
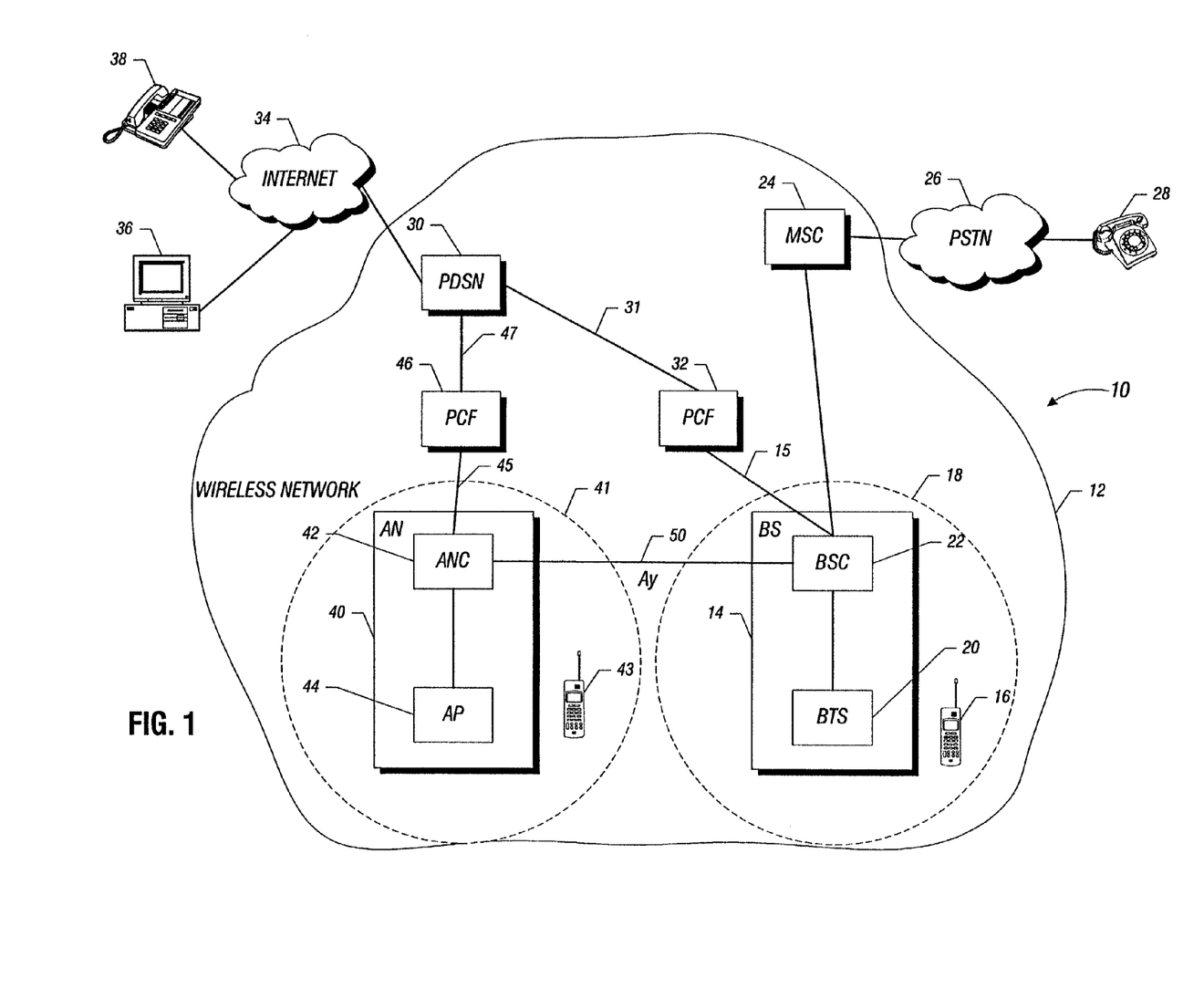
FIG. 1 is a block diagram of an example communications network that includes a wireless network.

Referring to FIG. 1, a wireless communications network 10 has a coverage area designated generally as 12. In one embodiment, the wireless communications network 10 includes components that operate according to CDMA (code-divisional multiple access) 2000. CDMA 2000 is defined by the CDMA 2000 family of standards (collectively referred to as the IS-2000 Standard), which is developed by the Third Generation Partnership Project 2 (3GPP2). However, in other embodiments, other types of wireless protocols can be used for communications in the wireless communications network 10.

The wireless communications network 10 includes a base station (BS) 14, which is an entity used for radio telecommunications with mobile stations (e.g., mobile station 16) within a cell 18 covered by the base station 14. The radio equipment of the base station 14 is implemented in a base transceiver subsystem (BTS) 20, and the control portion of the base station 14 is the base station controller (BSC) 22.

For communicating circuit-switched voice traffic, the base station 14 is coupled to a mobile switching center (MSC) 24, which is responsible for switching mobile station-originated or mobile station-terminated traffic. Effectively, the MSC 24 is the interface for signaling and user traffic between the wireless network 10 and other public switched networks (such as a public switched telephone network (PSTN) 26) or other MSCs. The PSTN 26 is connected to landline terminals, such as telephones 28.

In a voice call session between a mobile station (such as mobile station 16) and a landline terminal (such as telephone 28), voice traffic is routed through the air interface between the mobile station 16 and a base station 14, and through the base station 14, MSC 24, and PSTN 26.

The wireless communications network 10 also supports packet data services, in which packet data is communicated between a mobile station and another endpoint, which can be a terminal coupled to a data network 34 or another mobile station that is capable of communicating packet data. Examples of the data network 34 include private networks (such as local area networks or wide area networks) and public networks (such as the Internet). Packet data is communicated in a packet-switched communications session established between the mobile station and the other endpoint.

To communicate packet data, the base station 14 is coupled to a packet control function (PCF) module 32, which manages the relay of packets between the base station 14 and a packet data serving node (PDSN) 30. The base station 14 and PCF module 32 can be implemented on one platform or on multiple platforms. An interface 15 between the base station 14 and the PCF module 32 may include an A8 interface to carry user traffic and an A9 interface to carry signaling. An interface 31 between the PCF module 32 and PDSN 30 may include an A10 interface to carry user traffic and an A11 interface to carry signaling.

The PDSN 30 establishes, maintains, and terminates link layer sessions to mobile stations, and routes mobile station-originated or mobile station-terminated packet data traffic. The PDSN 30 is coupled to the public data network 34, which is connected to various endpoints, such as a computer 36 or a network telephone 38 (which is a telephone that is fitted with a network interface card for communications over packet data networks). Examples of packet data communications include web browsing, electronic mail, text chat sessions, file transfers, interactive game sessions, voice-over-IP (Internet Protocol) sessions, and so forth.

The wireless communications network 10 thus provides two different types of communications: circuit-switched communications and packet-switched communications. Circuit-switched communications are routed through the MSC 24, while packet-switched communications are routed through the PDSN 30. In circuit-switched communications, a dedicated end-to-end channel is established for the duration of a call session. However, packet-switched communications utilize a connectionless intranetwork layer, such as that defined by the Internet Protocol (IP). In packet-switched communications, packets or other units of data carry routing information (in the form of addresses) that is used to route the packets or data units over one or more paths to a destination endpoint.

One version of IP, referred to as IPv4, is described in Request for Comments (RFC) 791, entitled "Internet Protocol," dated September 1981; and another version of IP, referred to as IPv6, is described in RFC 2460, "Internet Protocol, Version 6 (IPv6) Specification," dated December 1998.

The base station 14 is part of a first type of wireless communications system, which in one example is a 1xRTT system. 1xRTT refers to one phase of the CDMA 2000 technology. More generally, the base station 14 is referred to as an IS-2000 base station.

The wireless communications network 10 also includes a second type of wireless communications system, which in the described example is a 1xEV-DO or 1xEV system. One version of 1xEV-DO is defined in the TIA/EIA/IS-856 Standard, entitled "CDMA 2000 High Rate Packet Data Air Interface Specification." Note that although only one base station 14 and one access network 40 are shown in FIG. 1, the wireless communications network 10 can include plural base stations 14 and plural access networks 40.

The first type of wireless communications system (e.g., 1xRTT system) supports packet data services at a first performance level while the second type of wireless communications system (e.g., 1xEV-DO system) supports packet data services at a second, higher performance level. As used here, the term "performance level" refers to data bandwidth, data rate, and/or any other parameter that indicates a level of performance in wireless communications. Thus, generally, the first and second types of wireless communication systems within the wireless communications network 10 provide different performance levels for packet data services.

The 1xEV-DO wireless communications system includes an access network (AN) 40, which is network equipment that provides data connectivity between a packet-switched data network (such as the data network 34 through the PDSN 30) and a mobile station (e.g., mobile station 43). The access network 40 provides coverage in a cell 41. According to 1xEV-DO, a mobile station is referred to as an access terminal (AT), which is a device that provides data connectivity to a user. However, as used here, "mobile station" refers to any user device, whether it is capable of communicating in a 1xRTT wireless system, 1xEV-DO wireless system, or other wireless system. Examples of mobile stations include personal digital assistants (PDAs), mobile telephones, mobile units coupled to portable computing devices, and so forth.

The access network 40 is equivalent to the base station 14 in the 1xRTT (or more generally, IS-2000) wireless system. The access network 40 includes an access network controller (ANC) 42 and an access point (AP) 44. As used here, "base station" or "base station system" refers to the base station 14, the access network 40, or any other radio network controller and/or radio transceiver that supports wireless communications with mobile stations.

A packet control function (PCF) module 46 is coupled between the access network 40 and the PDSN 30. An interface 45 between the access network 40 and the PCF module 46 may include A8 and A9 interfaces, and an interface 47 between the PCF module 46 and the PDSN 30 may include A10 and A11 interfaces. During a communications session, packet data is routed between the access terminal 43 and another endpoint through the access network 40, PCF module 46, and PDSN 30.

In accordance with some embodiments of the invention, a relatively graceful handoff procedure is provided for handing off a call between a first type of wireless system and a second type of wireless system in response to a mobile station crossing a boundary between a cell covered by the first type of wireless system and a cell covered by the second type of wireless system. In the arrangement illustrated in FIG. 1, the mobile stations 43 and 16 are assumed to be "hybrid" mobile stations that are able to support communications in both the first and second types of wireless systems. In one example, the hybrid mobile stations 43 and 16 are capable of supporting communications in both 1xRTT and 1xEV-DO wireless systems.

To support handoff of a call when one of the mobile stations 16 and 43 crosses between one cell (covered by the first type of wireless system) and another cell (covered by the second type of wireless system), an interface is defined between the access network 40 and the base station 14. In the example of FIG. 1, this interface is referred to as an Ay interface 50, which enables network-initiated handoff procedures.

According to one embodiment, the handoff performed is a hard handoff in which the call is maintained (that is, the call is not dropped and re-originated). A point-to-point protocol (PPP) connection between the mobile station and the PDSN 30 is maintained through the use of a permanent terminal identifier, referred to as an international mobile subscriber identity (IMSI). PPP is described in RFC 1661, entitled "Point-to-Point Protocol," dated July 1994.

To enable handoffs between an access network 40 and a base station 14 in the two different types of wireless systems, each of the access network 40 and base station 14 is able to detect that a mobile station is approaching the edge of the coverage area. Further, the access network 40 has information about neighboring 1xRTT (or more generally, IS-2000) pilots, and vice versa, the base station 14 has information about neighboring 1xEV-DO pilots.

Generally, when the access network 40 detects that a mobile station is approaching a coverage boundary, the access network 40 redirects the mobile station to the neighboring IS-2000 base station 14. The access network 40 also initiates a handoff procedure (network-initiated handoff procedure) by sending a message to notify the IS-2000 base station 14 that a handoff is required. This message includes the mobile station's permanent terminal identifier (IMSI) and a mobility event indicator. When the IS-2000 base station 14 receives the handoff notification, the base station 14 initiates procedures to transfer connections to the IS-2000 wireless system.

A similar procedure is performed in the reverse direction when a mobile station transitions from the coverage area of an IS-2000 base station 14 to the coverage area of a 1xEV-DO access network 40.

Figure 2:
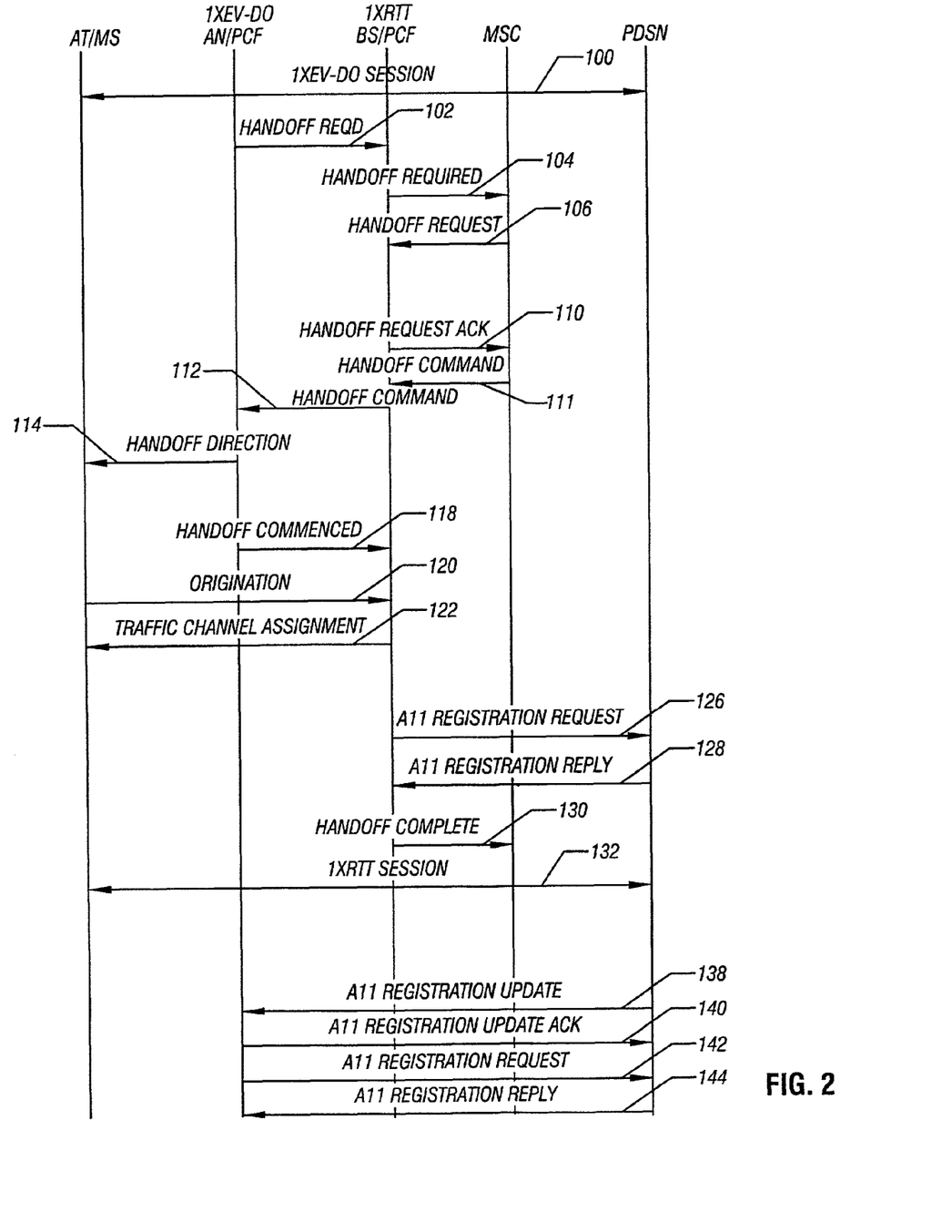
FIG. 2 is a message flow diagram for handing off a call between a 1xEV-DO system and a 1xRTT system.

Referring to FIG. 2, a message flow of the process of a handoff between the access network 40 and the base station 14 is illustrated. For the sake of simplicity, the access network 40 and associated PCF module 46 are shown as a unit, while the base station 14 and PCF module 32 are shown as a single unit.

An active 1xEV-DO data session 100 has been established between the mobile station and the PDSN 30. In one example, the data session can be a voice-over-IP session, which is a session in which voice is carried in IP packets between two endpoints (a mobile station and another endpoint, such as an endpoint coupled to the data network 34). Other types of sessions for carrying other types of data can also be established, such as data communicated during web browsing, electronic mail, text chat sessions, file transfers, interactive gaming sessions, and so forth.

As noted above, IP defines a packet-switched protocol in which packets are routed using addresses carried in the packets between endpoints. An IP network includes routers that route packets based on source and destination IP addresses carried in the packets. For voice-over-IP call sessions, voice data is carried as payload in IP packets. In one example, the voice data is stored in Real-Time Protocol (RTP) format. RTP defines a protocol for transporting real-time data, and is described in RFC 1889, entitled "RTP: A Transport Protocol for Real-Time Applications," dated January 1996.

As the mobile station (43 in the illustrated example of FIG. 1) moves toward the boundary of the cell 41, the access network 40 detects a condition that a hard handoff is required. This can be based on pilot strength measurements, for example. In response to this condition, the access network 40 sends a Handoff Required message (at 102) to the target base station 14 through the interface 50. The access network 40 inserts the PANID (previous access network identifier) of the source PCF module 46 in the Handoff Required message.

The Handoff Required message indicates that for a given mobile station that already has a dedicated radio resource assigned, a handoff is required for the reason given by a "Cause" information element. Conventionally, a Handoff Required message is sent by an IS-2000 base station to an MSC. In one embodiment, the Handoff Required message exchanged over the Ay interface 50 between the access network 40 and base station 14 is similar to Handoff Required messages exchanged between an IS-2000 base station and MSC, except that information elements are provided to indicate that the source system is a 1xEV-DO system.

The base station 14 then forwards the Handoff Required message (at 104) to the MSC 24 with an indication that the Handoff Required message is a relayed message requesting handoff from the 1xEV-DO access network 40. For example, this can be indicated in the "Cause" information element of the Handoff Required message. The message provides the MSC with a list of target candidate cells or optional measurement information for the MSC to use to determine a target with an available radio channel. Upon receiving a Handoff Required message, the MSC 24 may construct a candidate target list, modify an existing one, or use the existing list as received.

The MSC 24 then sends (at 106) a Handoff Request message to the target base station 14 to indicate that the mobile station is to be handed over to the base station 14. Upon receipt of the Handoff Request message, the target base station 14 allocates suitable idle radio resources.

The target base station also returns (at 110) a Handoff Request Acknowledge message to the MSC 24 with appropriate RF channel information to allow the mobile station to be instructed to tune to the new RF channel.

The MSC 24 then sends a Handoff Command message (at 111) to the target base station 14. The Handoff Command commences source cell handoff procedures. Note that, conventionally, the Handoff Command message is sent from the MSC to the source base station directly; however, in accordance with one embodiment, the MSC 24 sends the Handoff Command message to the target base station 14 in its role as proxy for the source access network 40.

In response, the target base station 14 then sends a Handoff Command message (at 112) to the source access network 40 over the Ay interface 50 containing the appropriate RF channel information. Upon receipt of the Handoff Command message, the source access network 40 instructs the mobile station to re-direct to the IS-2000 base station by sending (at 114) a Handoff Direction message.

The access network 40 next sends (at 118) a Handoff Commenced message to the target base station 14 over the Ay interface 50. The Handoff Commenced message is sent by the source access network 40 to the IS-2000 base station 14 to indicate that the Handoff Direction message has been sent to the mobile station and that the mobile station is not expected to return to the source access network 40. Note that, conventionally, the Handoff Command message is sent by the source base station to the MSC, but in the call flow of FIG. 2, the Handoff Command message is sent from the source access network 40 to the target base station 14.

The mobile station then sends (at 120) an Origination message to the target base station 14. The target base station 14 responds (at 122) with a Traffic Channel Assignment message.

Next, the target PCF module (in this case PCF module 32) sends (at 126) an A11 Registration Request message to the PDSN 30. The A11 Registration Request message contains the Mobility Event Indicator within the Vendor/Organization Specific Extension information element to the PSDN 30. The Mobility Event Indicator is used during dormant and active/hard handoffs. The A11 Registration Request message also includes the PANID (of the source PCF module 46) and the current access network identifier (CANID) (of the target PCF module 32) within the Vendor/Organization Specific Extension information element. The A11 Registration Request message is sent by the target PCF module 32 to the PDSN 30 after a short data burst has been successfully sent to the PDSN 30 from the target PCF 32, with the A11 Registration Request message sent to establish an A10 connection between the PCF module 32 and PDSN 30. The A11 Registration Request message is described in RFC 2002, entitled "IP Mobility Support," dated October 1996.

The PDSN 30 validates the A11 Registration Request message and accepts the connection by returning (at 128) an A11 Registration Reply message with an accept indication to the target PCF 32. The accept indication is provided in the "Code" information element of the A11 Registration Reply message. In response, the A10 connecting binding information at the PDSN 30 is updated to point to the target PCF module 32.

The target base station 14 detects that the mobile station has successfully accessed the target. The target base station 14 then sends (at 130) a Handoff Complete message to the MSC 24. This indicates to the MSC 24 that the mobile station has arrived on the new RF channel and has completed connection procedures. At this point, a 1xRTT session is established (at 132) between a mobile station and the PDSN 30 (also referred to as the A10 connection).

The PDSN 30 initiates termination of the A10 connection with the source PCF module (in this example PCF module 46) by sending (at 138) an A11 Registration Update message. The A11 Registration Update message is sent to update the status of the A10 connection, in this case to terminate the A10 connection. The source PCF module 46 responds (at 140) with an A11 Registration Update Acknowledge message.

The source PCF module 46 then sends (at 142) an A11 Registration Request message with the Lifetime information element set to zero to tear down the A10 connection. Also, accounting related information may be carried in the A11 Registration Request message sent at 142. The PDSN 30 stores the accounting related information for further processing before returning (at 144) an A11 Registration Reply message. The source PCF module 46 closes the A10 connection for the mobile station, which has been handed off to the target base station 14.

At this point, all maintenance procedures that are required of the target PCF module 32 continue.

The message flow for transitioning from a 1xRTT base station to a 1xEV-DO access network is similar to the message flow for transitioning from a 1xEV-DO access network to a 1xRTT base station, with some modifications. To initiate the handoff, the source 1xRTT base station also sends a Handoff Required message to the target 1xEV-DO access network. The 1xEV-DO access network then waits for the mobile station to send a Unicast Access Terminal Identifier (UATI)-Request message. The access network responds with a UATI-Assignment message in response, and then places the mobile station on the traffic channel. This is similar to the 1xEV-DO to 1xRTT transition, in which the network waits for the mobile station to show up. However, exchanges of messaging (104, 106, 110, 111, 130 in FIG. 2) between the target 1xEV-DO access network and the MSC do not occur.

The remaining flow of messages are identical to that shown in FIG. 2, except that the roles of the 1xRTT base station and 1xEV-DO access network are reversed. However, instead of a Handoff Complete message from the target to the MSC (130 in FIG. 2), the source 1xRTT base station sends an indication to the MSC that the connection has been handed off to a 1xEV-DO access network (and thus the MSC need no longer be involved in communications with the transitioning mobile station).

The MSC also sends a Clear Command message to the source 1xRTT base station to start a clearing procedure used in hard handoffs to release the source RF channel and terrestrial resource. In response to the Clear Command, the 1xRTT base station sends a Clear Complete message to the MSC.

Figure 3:
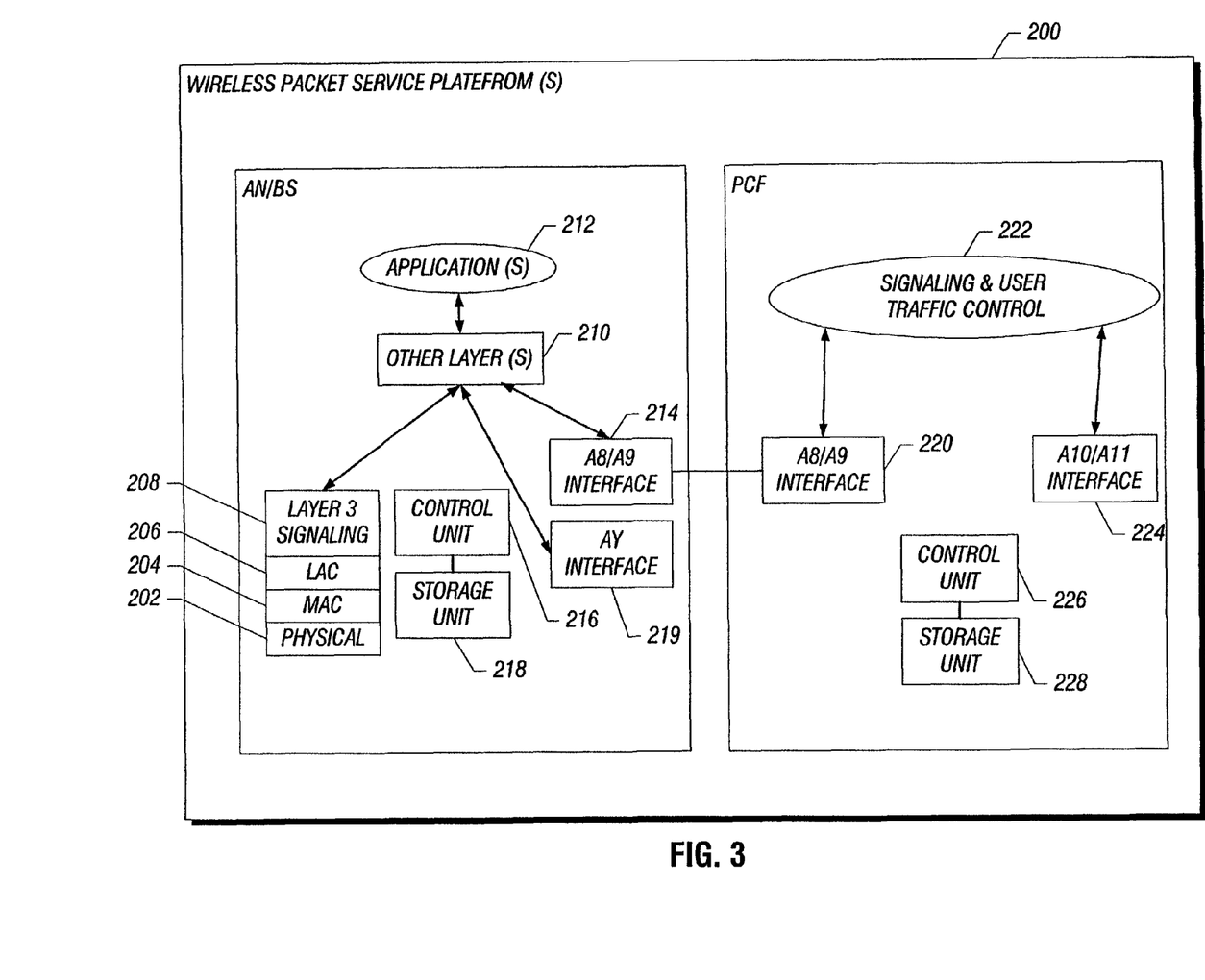
FIG. 3 is a block diagram of a platform or platforms including a base station or access network and a packet control function (PCF) module.

Referring to FIG. 3, some components inside the access network 40/base station 14 and PCF module 46 or 32 according to one example are illustrated. It is noted that FIG. 3 provides a functional view of some (but not all) of the components of the access network/base station. The access network/base station and PCF module may be implemented on one platform or on multiple platforms, referred to as wireless packet service platform(s) 200.

The access network/base station has a communications stack for communication over an air interface. The communications stack is made up of several layers, including a physical layer 202, a medium access control (MAC) layer 204, a link access control (LAC) layer 206, and a layer 3 signaling block 208. The physical layer 202 implements the physical layer protocol that provides channel structure, frequency, power output, and modulation specifications for the forward and reverse links in the air interface.

The MAC layer 204 implements the medium access protocol and is response for transport of LAC protocol data units using services provided by the physical layer 202. The LAC layer 206 implements a data link protocol that provides for the correct transport and delivery of signaling messages generated by the layer 3 signaling block 208. The layer 3 signaling block 208 provides the control messaging for wireless communications between the access network/base station and the mobile station. The access network/base station may also include other layers 210. In addition, one or more applications 212 may be executable in the access network/base station.

To communicate with the PCF module, the access network/base station includes A8 and A9 interfaces 214. As discussed above, the A8 interface carries user traffic between the base station or access network and the PCF module, and the A9 interface carries signaling between the base station or access network and the PCF module. Also, the access network/base station includes an Ay interface 219 to enable communication between a base station and access network.

The various components of the base station or access network illustrated in FIG. 3 can be implemented as software components, hardware components, or a combination thereof. The parts that are implemented in software are executable on a control unit 216 (which may be implemented as a single processor or as multiple processors). The control unit 216 is coupled to a storage unit 218 for storing data and instructions of software.

The PCF module includes A8 and A9 interfaces 220, as well as signaling and user traffic control module 222. Other layers may also be present in the PCF module, which are not shown. The signaling and user traffic control module 222 also communicates with A10/A11 interface 224. As noted above, the A10 interface carries user traffic between the PCF module and the PDSN 30, and the A11 interface carries signaling between the PCF module and the PDSN 30.

The components of the PCF module may be implemented as software, hardware, or a combination thereof. Parts that are implemented in software are executable on a control unit 226, which is coupled to a storage unit 228 in the PCF module.

Each control unit referred to herein includes a microprocessor, a microcontroller, a processor card (including one or more microprocessors or microcontrollers), or other control or computing devices. The storage units referred to in this discussion include one or more machine-readable storage media for storing data and instructions. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Instructions that make up the various software routines or modules in the various devices or systems are stored in respective storage devices. The instructions when executed by a respective control unit cause the corresponding node or system to perform programmed acts.

The instructions of the software routines or modules are loaded or transported to each node or system in one of many different ways. For example, code segments including instructions stored on floppy disks, CD or DVD media, a hard disk, or transported through a network interface card, modem, or other interface device are loaded into the device or system and executed as corresponding software routines or modules. In the loading or transport process, data signals that are embodied in carrier waves (transmitted over telephone lines, network lines, wireless links, cables, and the like) communicate the code segments, including instructions, to the device or system. Such carrier waves are in the form of electrical, optical, acoustical, electromagnetic, or other types of signals.

As used here, a "controller" refers to a hardware component, software component, or a combination of the two. Although used in the singular sense, a "controller" can also refer to plural hardware components, plural software components, or a combination thereof.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of performing wireless communications, comprising:

communicating bearer traffic for a packet-switched communications session between a mobile station and a first base station associated with a first type of wireless system;

determining if handoff is required from the first base station to a second base station associated with a second, different type of wireless system; and in response to determining that the handoff is required, sending a message from the first base station to the second base station over an interface between the first base station and second base station, the message indicating to the second base station that handoff is required, wherein sending the message comprises sending the message over a link that directly connects the first base station and second base station.

2. The method of claim 1, wherein the first base station comprises an IS-2000 base station, and wherein communicating the bearer traffic comprises communicating the bearer traffic between the mobile station and the IS-2000 base station.

3. The method of claim 2, wherein determining if handoff is required from the first base station to the second base station comprises determining if handoff is required from the IS-2000 base station to a 1xEV access network.

4. The method of claim 1, wherein the first base station comprises a 1xEV access network, and wherein communicating the bearer traffic comprises communicating the bearer traffic between the mobile station and the 1xEV access network.

5. The method of claim 4, wherein determining if handoff is required from the first base station to the second base station comprises determining if handoff is required from the 1xEV access network to a 1xRTT base station.

6. The method of claim 1, further comprising sending another message from the second base station to the first base station to initiate a handoff procedure.

7. The method of claim 6, further comprising sending a further message from the first base station to the second base station to indicate that the mobile station has been directed to hand off to the second base station.

8. The method of claim 1, wherein sending the message comprises sending the message over a link between the first base station and the second base station.

9. The method of claim 1, further comprising performing a hard handoff between the first base station and the second base station.

10. A first base station system that performs wireless communications with a mobile station according to a first protocol, the first base station system comprising:

an interface to a second base station system that performs wireless communications with the mobile station according to a second, different protocol; and a controller to communicate bearer traffic for a packet-switched communications session with the mobile station, the controller to further exchange messaging with the second base station system through the interface to perform a handoff of the packet-switched communications session from the first base station system to the second base station system, wherein the interface allows the messaging to be sent from the first base station system directly to the second base station system.

11. The first base station system of claim 10, wherein the controller is to perform the handoff by performing a hard handoff.

12. The first base station system of claim 10, wherein the controller is to communicate bearer traffic according to a 1xRTT format with the mobile station.

13. The first base station system of claim 12, wherein the second base station system comprises a 1xEV base station, and wherein the controller is to exchange the messaging with the 1xEV base station.

14. The first base station system of claim 10, wherein the controller is to exchange the messaging by sending a message indicating that a handoff is required to the second base station system through the interface.

15. The first base station system of claim 14, wherein the controller is to exchange the messaging by receiving a message initiating the handoff procedure.

16. The first base station system of claim 15, wherein the controller is to send a further message from the first base station system to the second base station system to indicate that the mobile station has been directed to hand off to the second base station system.

17. An article comprising at least one non-transitory machine-readable storage medium containing instructions that when executed cause a first base station system to:
 exchange signaling according to a first protocol with a mobile station to establish a packet-switched communications session between the mobile station and another endpoint;
 determine if a handoff is required to a second base station system that performs wireless communications with the mobile station according to a second, different protocol; and
 exchange messaging with the second base station system through a link between the first and second base station systems to perform the handoff, wherein exchanging the messaging with the second base station through the link comprises exchanging the messaging with the second base station through the link that directly connects the first base station system to the second base station system.

18. The article of claim 17, wherein the first base station comprises a 1xRTT base station, and wherein the instructions when executed cause the first base station system to exchange 1xRTT signaling with the mobile station.

19. The article of claim 18, wherein the instructions when executed cause the first base station system to determine if handoff is required by determining if handoff is required from the 1xRTT base station to one of a 1xEV access network and a High Data Rate (HDR) access network.

20. The article of claim 17, wherein the first base station comprises one of a High Data Rate (HDR) access network and a 1xEV access network, and wherein the instructions when executed cause the first base station system to exchange one of High Data Rate (HDR) signaling and 1xEV signaling with the mobile station.

21. The article of claim 20, wherein the instructions when executed cause the first base station system to determine if handoff is required by determining if handoff is required from the one of the High Data Rate (HDR) access network and 1xEV access network to a 1xRTT base station.

22. The article of claim 17, wherein the instructions when executed cause the first base station system to exchange the messaging by sending a message to the second base station system indicating that a handoff is required.

23. The method of claim 1, wherein sending the message comprises sending the message over a link that directly connects the first base station and second base station.

24. The apparatus of claim 10, wherein the interface allows the messaging to be sent from the first base station system directly to the second base station system.

25. The article of claim 17, wherein exchanging the messaging with the second base station through the link comprises exchanging the messaging with the second base station through the link that directly connects the first base station system to the second base station system.

26. The method of claim 1, wherein the mobile station comprises a hybrid mobile station that is able to support at least two different wireless communications protocols including a first wireless communications protocol and a second wireless communications protocol,
 wherein determining if the handoff is required from the first base station to the second base station comprises determining if the handoff is required from the first base station that communicates with the hybrid mobile station according to the first wireless communications protocol, to the second base station that communicates with the hybrid mobile station according to the second wireless communications protocol.

27. The method of claim 26, wherein the first wireless communications protocol comprises a 1xEV protocol, and the second wireless communications protocol comprises a 1xRTT protocol.

28. The apparatus of claim 10, wherein the mobile station comprises a hybrid mobile station that is able to perform wireless communications according to both the first and second protocols, the controller to communicate the bearer traffic with the hybrid mobile station.

29. The apparatus of claim 28, wherein the first protocol comprises a 1xEV protocol, and the second protocol comprises a 1xRTT protocol.

30. The article of claim 17, wherein exchanging the signaling with the mobile station comprises exchanging the signaling with a hybrid mobile station that is able to perform wireless communications according to both the first and second protocols.

31. The article of claim 30, wherein the first protocol comprises a 1xEV protocol, and the second protocol comprises a 1xRTT protocol.

* * * * *

UNITED STATES PATENT AND TRADEMARK OFFICE
CERTIFICATE OF CORRECTION

PATENT NO.       : 7,843,878 B2                                   Page 1 of 1
APPLICATION NO.  : 09/960008
DATED            : November 30, 2010
INVENTOR(S)      : Morales et al.

It is certified that error appears in the above-identified patent and that said Letters Patent is hereby corrected as shown below:

On Page 2 item (56), under "OTHER PUBLICATIONS", in Column 2, Line 1, delete "Perkins, ," and insert -- Perkins, --, therefor.

In Column 1, Line 6, delete "APPLICATION" and insert -- APPLICATIONS --, therefor.

In Column 7, Line 17, delete "PSDN" and insert -- PDSN --, therefor.

In Column 10, Line 37, in Claim 7, delete "hand off" and insert -- handoff --, therefor.

In Column 11, Line 15, in Claim 16, delete "hand off" and insert -- handoff --, therefor.

Signed and Sealed this
Twelfth Day of April, 2011

David J. Kappos
*Director of the United States Patent and Trademark Office*